United States Patent
Li

(10) Patent No.: US 10,162,781 B2
(45) Date of Patent: Dec. 25, 2018

(54) LOGIC COMPONENT SWITCH

(71) Applicant: Micron Technology, Inc., Boise, ID (US)

(72) Inventor: Jian Li, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 143 days.

(21) Appl. No.: 15/170,183

(22) Filed: Jun. 1, 2016

(65) Prior Publication Data

US 2017/0351628 A1     Dec. 7, 2017

(51) Int. Cl.
 G06F 13/40 (2006.01)
 G06F 13/16 (2006.01)

(52) U.S. Cl.
 CPC ...... G06F 13/4022 (2013.01); G06F 13/1605 (2013.01)

(58) Field of Classification Search
 None
 See application file for complete search history.

(56) References Cited

U.S. PATENT DOCUMENTS

| | | | |
|---|---|---|---|
| 3,573,757 A | 4/1971 | Adams | |
| 4,949,298 A | 8/1990 | Nakanishi et al. | |
| 5,559,970 A | 9/1996 | Sharma | |
| 6,070,217 A | 5/2000 | Connolly et al. | |
| 8,576,865 B1 * | 11/2013 | Lo | H04L 49/30 370/419 |
| 9,432,298 B1 * | 8/2016 | Smith | H04L 49/9057 |
| 2006/0132190 A1 * | 6/2006 | Driediger | G01R 23/005 327/47 |
| 2015/0192980 A1 * | 7/2015 | Sen | G06F 1/3203 713/320 |
| 2016/0342541 A1 * | 11/2016 | Tokoyoda | G06F 13/1673 |

* cited by examiner

*Primary Examiner* — Henry Tsai
*Assistant Examiner* — John B Roche
(74) *Attorney, Agent, or Firm* — Brooks, Cameron & Huebsch, PLLC

(57) ABSTRACT

The present disclosure relates generally to semiconductor memory and methods, and more particularly, to apparatuses, and methods for controlling logic die circuitries. One example apparatus comprises a logic die including a first serialization/deserialization (SERDES) component and a second SERDES component coupled to the logic die, and a switch component coupled to the first SERDES component and the second SERDES component configured to activate one of the number of SERDES components.

26 Claims, 6 Drawing Sheets

LOGIC COMPONENT SWITCH

TECHNICAL FIELD

The present disclosure relates generally to semiconductor memory and methods, and more particularly, to apparatuses, and methods using a logic component switch.

BACKGROUND

Memory devices are typically provided as internal, semiconductor, integrated circuits in computing devices or other electronic devices. There are many different types of memory including volatile and non-volatile memory. Volatile memory can require power to maintain its data (e.g., user data, error data, etc.) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Computing devices can include a number of serializer/deserializer (SERDES) components coupled to a hardware logic device (e.g., a logic die, application-specific integrated circuit (ASIC), corresponding logic in another device, etc.). The number of SERDES components can perform serialization and/or deserialization of instructions and/or data to provide data transmission over a limited input/output interface.

DETAILED DESCRIPTION

Figure 1:
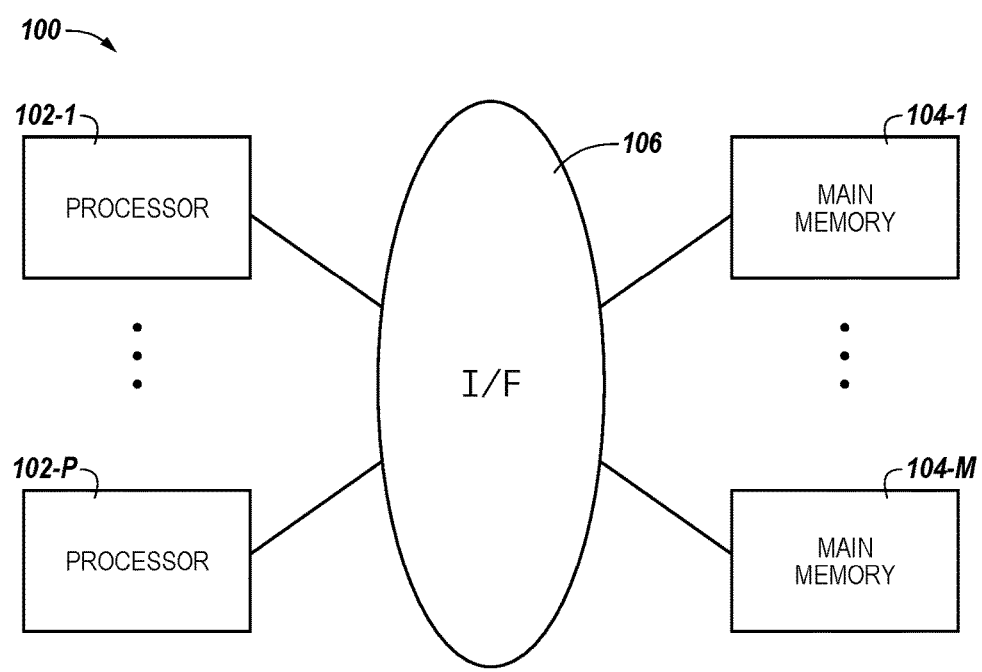
FIG. 1 illustrates a block diagram of an apparatus in the form of a computing device including a number of processors, a number of main memory devices, and an interface therebetween in accordance with a number of embodiments of the present disclosure.

The present disclosure relates generally to semiconductor memory and methods, and more particularly, to apparatuses, and methods using a logic component switch. One example apparatus comprises a logic die including a first serialization/deserialization (SERDES) component and a second SERDES component, and a switch component coupled to the first SERDES component and the second SERDES component configured to control which of the first and second number of SERDES components is active.

A memory interface between a processor and a main memory can provide various methods in transmitting data across the interface (e.g., serialization/deserialization). An example of a main memory with an interface is a stacked memory system (e.g., hybrid memory cube (HMC)). In an HMC, this function is achieved by a packetized network protocol coupled with hardware logic (e.g., logic-layer memory control). Such interfaces can allow for a simplified processor-side memory controller interface, out-of-order return of main memory request, localized row address strobe (RAS) and/or a column address strobe (CAS) management of the main memory, advanced memory topologies and sharing strategies in multiprocessor apparatuses, both homogeneous and heterogeneous, locally managed synchronization functions and metadata storage, and resilience (e.g., where failed portions of memory such as words or blocks can be remapped, such as by a logic layer in memory).

Embodiments of the present disclosure can provide benefits such as reducing cost of replacing HMC components. For example, consider a HMC package in which a number of SERDES components are integrated. Due to the HMC package's structure, where the number of components (e.g., SERDES components) are densely integrated, it may be expensive to replace those SERDES components that have experienced abnormal function and/or a failure event (e.g., at least a portion of the SERDES components has failed and/or is functioning abnormally). Embodiments of the present disclosure can provide a method to deactivate the erroneous SERDES component(s) and activate an operable SERDES component(s) that are already integrated to the HMC package to maintain function of the HMC package. Therefore, embodiments of the present disclosure can reduce a need to disassemble the HMC package to replace the failed SERDES component(s).

Reducing the need of disassembling the HMC package to maintain the function of the HMC package can provide benefits such as increasing reliability, and/or lifetime of the memory, among other benefits. For example, the cost of replacing failed SERDES components may exceed the benefit of having failed SERDES components replaced. However, embodiments of the present disclosure may prolong the lifetime of the memory by maintaining the function of the HMC package without the need of replacing failed SERDES components. Embodiments of the present disclosure also can increase the reliability by deactivating failed SERDES components and using available functioning SERDES components.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "B", "L", "M", "N", and "P", particularly with respect to reference numerals in the drawings, indicates that a number of the particular feature so designated can be included. As used herein, "a number of" a particular thing can refer to one or more of such things (e.g., a number of memory devices can refer to one or more memory devices).

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates a block diagram of an apparatus in the form of a computing device 100 including a number of processors 102-1, ..., 102-P, a number of main memory devices 104-1, ..., 104-M, and an interface 106 therebetween in accordance with a number of embodiments of the present disclosure. As will be appreciated by one of ordinary skill in the art, "main memory" describes memory storing data that can be directly accessed and manipulated by a processor. An example of main memory is DRAM. Main memory provides primary storage of data and can be volatile memory or non-volatile memory (e.g., in the case of non-volatile RAM managed as a main memory, such as a non-volatile dual in-line memory module (DIMM)). Secondary storage can be used to provide secondary storage of data and may not be directly accessible by the processor. However, as used herein, "main memory" does not necessarily have to be volatile memory, and can in some embodiments be non-volatile memory.

As used herein, a computing device 100, a processor 102, a memory device 104, or an interface 106 might also be separately considered an "apparatus." The computing device 100 can be any electronic device including a processor and main memory storing data that is accessed by the processor. Examples of computing devices 100 include supercomputers, personal computers, video cards, sound cards, and mobile electronic devices such as laptop computers, tablets, smartphones, and the like.

The processors 102-1, ..., 102-P can be any type of general purpose processors. For example, the processors 102-1, ..., 102-P can be cache based processors, vector processors (e.g., single instruction multiple data (SIMD)), scalar processors (e.g., single instruction single data (SISD)), multiple instruction single data (MISD), multiple instruction multiple data (MIMD) processors, etc. In some embodiments, the processors 102-1, ..., 102-P do not provide timing control of the main memory devices 104-1, ..., 104-M. The processors 102-1, ..., 102-P can be configured to send a request via the interface 106 to the main memory devices 104-1, ..., 104-M without being aware of a read time associated with the request (e.g., the processors 102-1, ..., 102-P may not control and/or be aware of when the requested data will be received by the processors 102-1, ..., 102-P). The request from the processors 102-1, ..., 102-P may not have timing associated therewith, leaving the determination when to respond to the request to the main memory devices 104-1, ..., 104-M.

The main memory devices 104-1, ..., 104-M can store data that is operated on by the processors 102-1, ..., 102-P. Examples of main memory devices include DRAM and HMC, among others. However, according to a number of embodiments of the present disclosure, the main memory devices 104-1, ..., 104-M can control their timing independently of the processors 102-1, ..., 102-P for interaction between the main memory devices 104-1, ..., 104-M and the processors 102-1, ..., 102-P. For example, the main memory devices 104-1, ..., 104-M can provide their own timing control of a row address strobe (RAS) and/or a column address strobe (CAS) for accessing the main memory devices 104-1, ..., 104-M. Examples of such timing control include random read or write cycle time, access time, etc.

In a number of embodiments, the processors 102-1, ..., 102-P can be requesting devices. For example, the processors 102-1, ..., 102-P can request data from or store data in the main memory devices 104-1, ..., 104-M. In transmitting data between the processors 102-1, ..., 102-P and the main memory devices 104-1, ..., 104-M, the interface 106 can temporarily store the data in a number of different formats. For example, the interface 106 can include a number of parallel busses that can carry data in parallel or a number of serial buses that can carry data in a bit-serial format. The interface 106 can also include a number of SERDES components which can translate (e.g., serialize/deserialize) the data into a different format. For example, the interface 106 including the number of SERDES components may serialize the data that is stored in parallel in the processors 102-1, ..., 102-P to temporarily store the data in serial format. The interface 106 may deserialize the data stored in serial format to store the data in the main memory devices 104-1, ..., 104-M in parallel format.

Figure 2:
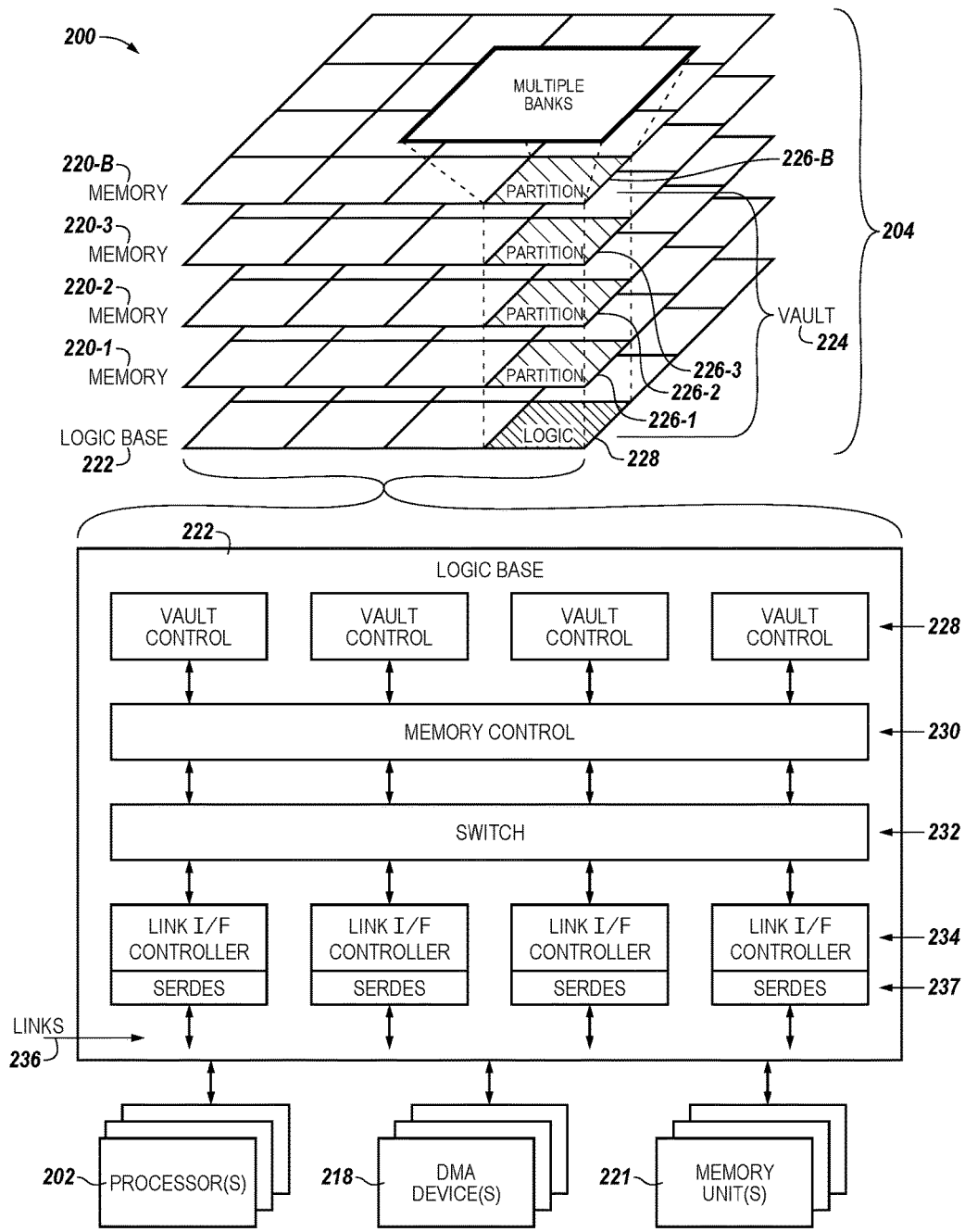
FIG. 2 illustrates an illustration of a more detailed view of a logic device coupled between the memory devices and the requesting devices in accordance with a number of embodiments of the present disclosure.

FIG. 2 illustrates a block diagram of an apparatus in the form of a computing device 200 including a main memory device 204 and a number of requesting devices 202, 218, 221 in accordance with a number of embodiments of the present disclosure. Examples of requesting devices can include a processor 202, a DMA device 218, and/or a memory unit 221, among others. The processor(s) 202 can be analogous to the processors 102-1, ..., 102-P illustrated in FIG. 1. The memory unit 221 can be analogous to the main memory 104 illustrated in FIG. 1 and/or to another memory unit other than a main memory. The computing device 200 can be analogous to the computing device 100 illustrated in FIG. 1. In FIG. 2, more detail is shown regarding a specific example of a main memory 204 that is a stacked memory system (e.g., hybrid memory cube (HMC)). The HMC 204 illustrated in FIG. 2 can be analogous to the main memory devices 104-1, ..., 104-M illustrated in FIG. 1.

An HMC 204 can be a single package including multiple memory devices 220-1, 220-2, 220-3, ..., 220-B (e.g., DRAM dies) and hardware logic device 222 (e.g., a logic die, application-specific integrated circuit (ASIC), corresponding logic in another device, etc.) stacked together using through silicon vias (TSV), although other embodiments may differ (e.g., the hardware logic device 222 may not necessarily be stacked with the memory devices 220). The memory within the HMC 204 can be organized into subsets (e.g., vaults) 224, where each vault 224 is functionally and operationally independent of other vaults 224. Each vault 224 can include a partition (e.g., partition 226-1, 226-2, 226-3, and 226-B) of memory from each of the memory devices 220. Each vault 224 can include a hardware logic unit 228 (e.g., vault controller) in the logic device 222 that functions analogously to a memory controller for the vault 224. Each vault controller 224 can be coupled to a respective subset of the plurality of memory devices 220. For example, the vault controller 228 can manage memory operations for the vault 224 including determining its own timing requirements (e.g., instead of being managed by a requesting device such as a processor). The vault controller 228 can include a number of buffers for requests and responses with a processor 202 and can utilize the number of buffers to send responses to the processor 202 out of order with respect to an order in which the requests were received from the processor 202. Thus, the processor 202 can be configured to send a request via an interface to the HMC 204 without being aware of a read time associated with the request.

FIG. 2 includes an illustration of a more detailed view of a logic device 222 coupled between the memory devices 220 and the requesting devices 202, 218, 221. The logic base 222 can include memory control logic 228 for each vault (e.g., vault control). The vault controller 228 can be coupled to a shared memory control logic 230 for the HMC 204 that can consolidate functions of the vaults 224. However, the shared memory control logic 230 does not necessarily comprise a central memory controller in the traditional sense because each of the vaults 224 can be directly controlled (e.g., controlled timing, access, etc.) independently of each other and because the shared memory control logic 230 does not necessarily interface (e.g., directly interface) with the requesting devices 202, 218, 221. Thus, in some embodiments, the computing device 200 and/or the main memory 204 does not include a central memory controller. The memory control logic 230 can be coupled to a switch 232 (e.g., a crossbar switch). The switch 232 can provide availability of the collective internal bandwidth from the vaults 224 to the input/output (I/O) links 236. The switch 232 can be coupled to link interface controllers 234, which control I/O links 236 to a requesting device 202, 218, 221. For example, the I/O links 236 can be serial fully duplexed input/output links. The logic device 222 can provide a logical/physical interface for the main memory 204.

In a number of embodiments, a number of SERDES components 237 can be located on each of the number of link interface controller. For example, a SERDES component 237 can be located on each of the number of link interface controller 234. The SERDES 237 components can serialize/deserialize data or instructions received at or sent from the link interface controller 234. Details regarding the number of SERDES located on each of the number of link interface controllers and associated with serializing/deserializing will be further described herein.

The main memory 204 can receive requests from requesting devices such as a processor 202, a DMA device 218, and/or a memory unit 221, among others. As described herein, in some embodiments, the main memory 204 can be configured to provide an indication that locations in the main memory 204, from which data is gathered, are unavailable until the gathered data is released by the requesting device 202, 218, 221. Such embodiments can provide a synchronization mechanism (e.g., so that stale data is not delivered in response to a request from the DMA device 218 while the data is being operated on by the processor 202).

Figure 3:
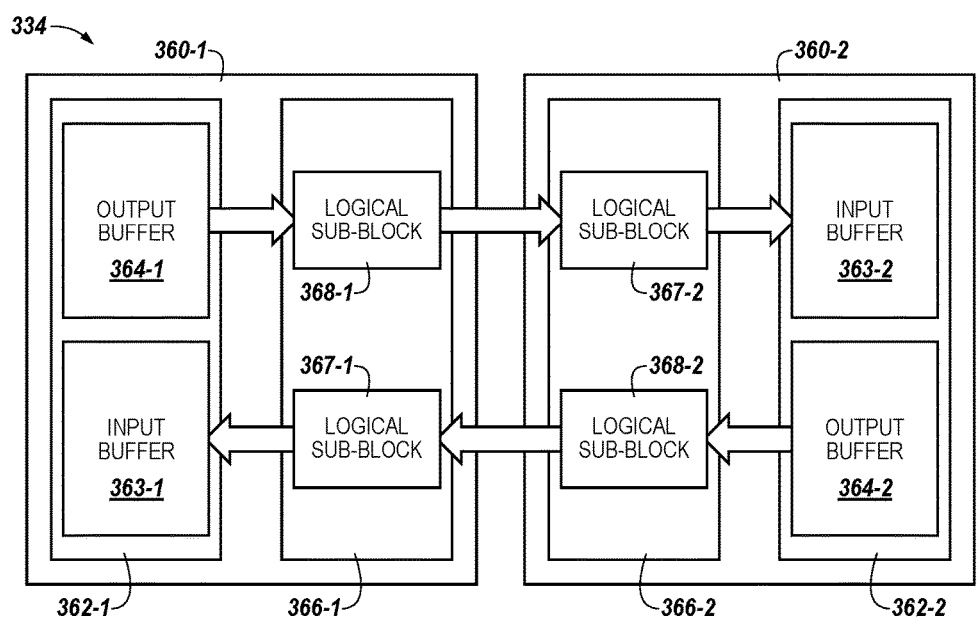
FIG. 3 illustrates a block diagram of a portion of a logic device in accordance with a number of embodiments of the present disclosure.

FIG. 3 illustrates a block diagram of a portion of a logic device in accordance with a number of embodiments of the present disclosure. A link interface controller 334 can be analogous to the link interface controller 234 as illustrated in FIG. 2. Each link interface controller 334 can include a requesting component 360-1 and a responding component 360-2. The requesting component 360-1 and the responding component 360-2 can include a physical layer (e.g., physical layer 366-1 and 366-2) and a transaction layer (e.g., transaction layer 362-1 and 362 2). Each transaction layer 362 can include an output buffer (e.g., output buffer 364-1 and 364-2 as illustrated in FIG. 3), and an input buffer (e.g., input buffer 363-1 and 363-2 as illustrated in FIG. 3). Each physical layer 366 can include a number of logical sub-blocks (e.g., a logical sub-block 367-1, 367-2, 368-1, and 368-2), as illustrated in FIG. 3.

As illustrated in FIG. 3, a number of instructions or data can be transmitted in both directions across the link. For example, the number of instructions of data can be received at the output buffer 364-1 (e.g., where the number of instructions or data can be stored temporarily) of the first device 360-1, and transmitted to the logical sub-block 368-1 (e.g., in parallel) of the physical lane 366-1. Upon receiving the number of instructions or data, the logical sub-block 368-1 can transmit those instructions and data to the logical sub-block 367-2 of the second device 360-2. The second device 360-2 can transmit those instructions and data to the input buffer 363-2 for temporary storage and/or further transmission. Similarly, the number of instructions or data can be transmitted from the second device 360-2 to the first device 360-1. For example, the number of instructions or data can be received at the output buffer 364-2 of the second device 360-2, and transmitted to the logical sub-block 368-2 of the physical lane 366-2. Upon receiving the number of instructions and data, the logical sub-block 368-2 can transmit those instructions and data to the logical sub-block 367-1 of the first device 360-1.

The number of logical sub-blocks (e.g., logical sub-block 367-1, 367-2, 368-1, and 368-2) in each device (e.g., first and second device 360-1 and 360-2) can serialize or deserialize the received instructions or data. For example, instructions or data received at the output buffer 364-1 can be sent in parallel to the logical sub-block 368-1, and the logical sub-block 368-1 can serialize the number of instructions or data. Serialized instructions or data can be sent to the logical sub-block 367-2 where the instructions or data can be deserialized by the logical sub-block 367-2 and sent to the input buffer 363-2 in parallel.

Although not illustrated in FIG. 3, each transactional layer 362-1 and 362-2 can include other components as well. For example, each transactional layer (e.g., transactional layer 362-1 and 362-2) can include a retry buffer that can be used to save instructions or data for potential re-transmission (e.g., when errors occur within the link interface controller 334). For example, each transactional layer can include a number of decoder and error correcting components that can perform a sequence check, a length check, and a number of ECC schemes (e.g., a Cyclic Redundancy Checks) to verify whether the instructions or data are erroneous or not.

Figure 4A:
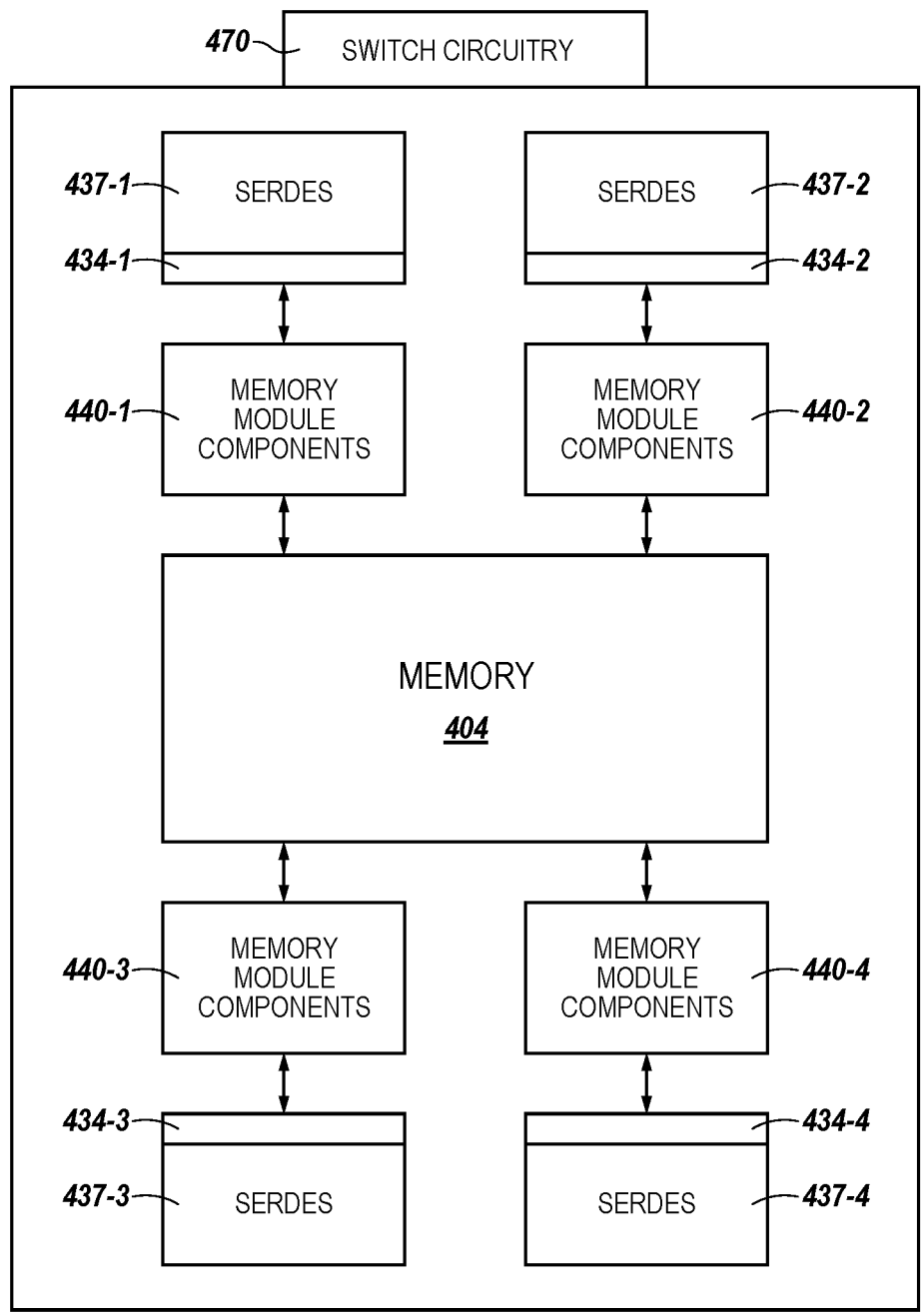
FIGS. 4A, 4B, and 4C illustrate a block diagram of a number of switches coupled to a portion of a logic device in accordance with a number of embodiments of the present disclosure.
Figure 4B:
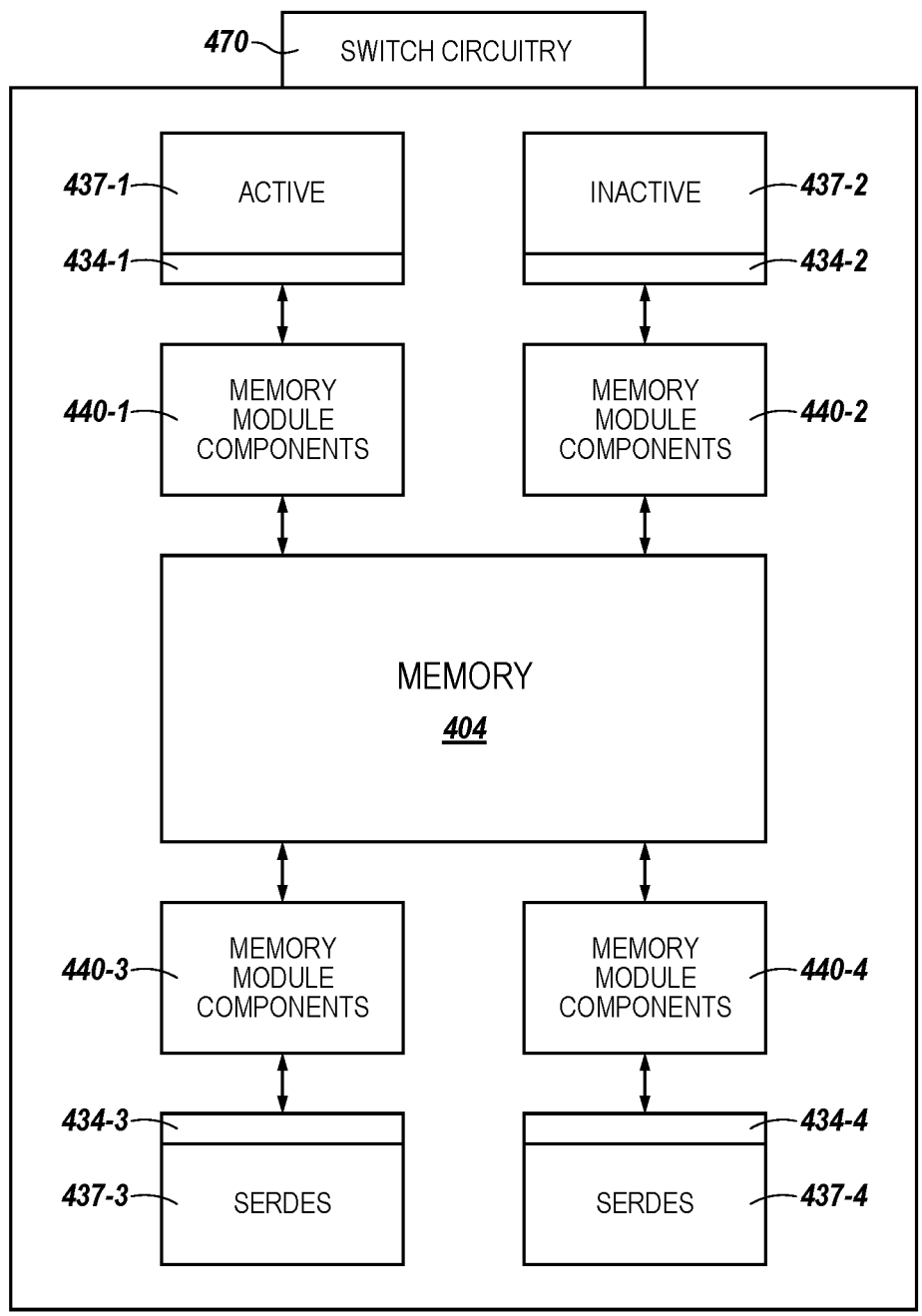
Figure 4C:
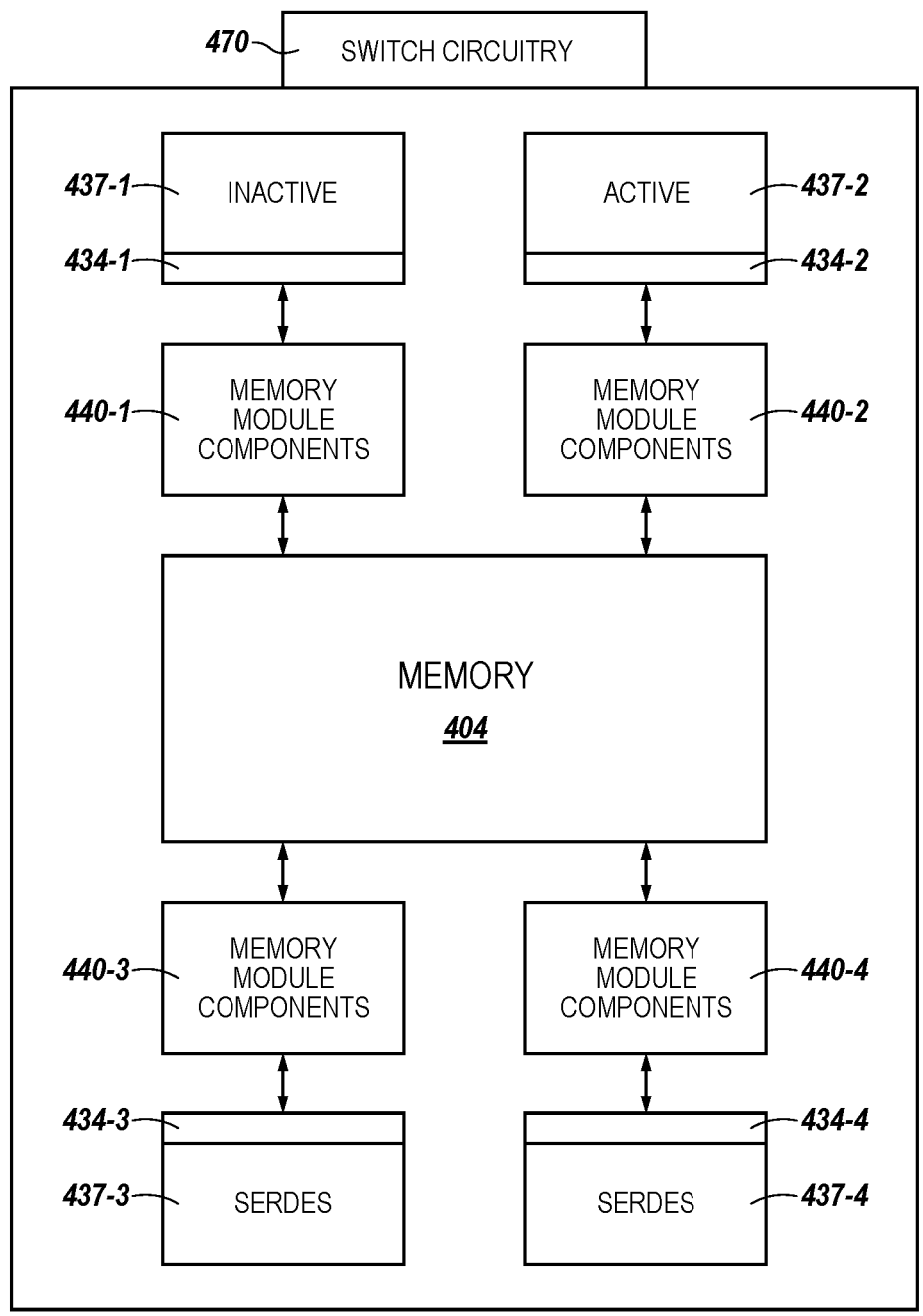

FIGS. 4A, 4B, and 4C illustrate a block diagram of a switch circuitry coupled to a portion of a logic device in accordance with a number of embodiments of the present disclosure. Link interface controllers 434-1, 434-2, 434-3, and 434-4 can be analogous to those illustrated in FIG. 2 and FIG. 3. Embodiments illustrated in FIGS. 4A and 4B can include a switch circuitry 470, a number of SERDES coupled to and/or located on each corresponding link interface controller, the number of link interface controllers (e.g., link interface controller 434-1, 434-2, 434-4, and 434-4), memory module components (e.g., memory module components 440-1, 440-2, 440-3, and 440-4) configured to communicate with each corresponding link interface controller, and memory 404. The number of SERDES coupled to and/or located on each corresponding link interface controller can be coupled (e.g., physically) to the switch circuitry 470. For example, the SERDES 437-1 coupled to and/or located on the link interface controller 434-1 can be physically coupled to the switch circuitry 470.

FIG. 4A illustrates the number of SERDES 437-1, 437-2, 437-3, and 437-4 coupled to and/or located on each corresponding link interface controller 434-1, 434-2, 434-3, and 434-4 and coupled to the switch circuitry 470. Although embodiments of the present disclosure are not limited to a particular coupling method, the switch circuitry 470 can be physically coupled to the number of link interface controllers 434-1, 434-2, 434-3, and 434-4. For example, the switch circuitry 470 can be a black silicon/internal switch to control the number of link interface controllers 434-1, 434-2, 434-3, and 434-4.

In FIGS. 4A, 4B, and 4C, more detail is shown regarding a specific example of a logic device that is a part of a stacked memory system (e.g., HMC). For example, the number of SERDES can be located on each corner of the logic device, as illustrated in FIGS. 4A, 4B, and 4C. Due to higher power density of each SERDES, locations within the logic device where each of the number of SERDES is located typically have a higher temperature than other area during an operation of the memory device. In contrast, the SERDES may typically have lower thermal specification (e.g., a thermal specification of 105° C. whereas the rest of the logic device can have a thermal specification of 125° C.); therefore, each of the number of SERDES can be susceptible to errors or malfunctions due to their tight thermal tolerance requirements. Therefore, providing the switch circuitry 470 to control the number of SERDES (e.g., SERDES 437-1, 437-2, 437-3, AND 437-4) can increase reliability (e.g., by deactivating failed SERDES components and using available functioning) and/or prolong the lifetime of the memory by maintaining the function of the HMC package without the need of replacing failed SERDES components.

The switch circuitry 470 can control the number of SERDES 437-1, 437-2, 437-3, AND 437-4 coupled to the switch circuitry 470. For example, the switch circuitry 470 can control the number of SERDES 437-1, 437-2, 437-3, and 437-4 upon determining that a portion of the number of SERDES 437-1, 437-2, 437-3, and 437-4 have failed and/or are abnormally functioning due to various reasons. For example, the portion of the number of SERDES 437-1, 437-2, 437-3, and 437-4 may be abnormally functioning due to failure of a portion of the number of SERDES components (e.g., logical sub-blocks 367-1, 367-2, 368-1, and 368-2, as illustrated in FIG. 3) due to their tight thermal tolerance requirements. A computing device (e.g., computing device 200) can be configured to determine whether those number of SERDES components are normally operating. For example, the computing device can be configured to detect abnormal electric signals caused from failed SERDES components, and determine which SERDES component(s) abnormally functions and/or experienced the failure event. A number of methods associated with controlling the number of interface controllers will be further described herein.

The switch circuitry can further control a number of memory components coupled to or that are specific to each of the number of SERDES 437-1, 437-2, 437-3, and 437-4. For example, when controlling (e.g., activating and/or deactivating) each of the number of SERDES 437-1, 437-2, 437-3, and 437-4, the switch circuitry 470 can also control each corresponding link interface controller 434-1, 434-2, 434-3, and 434-4 and/or memory module component 440-1, 440-2, 440-3, and 440-4. For example, when activating the SERDES 437-2, the switch circuitry 470 can also activate the link interface 434-2 and the memory module component 440-2 that are coupled to the SERDES 437-2. For example, when deactivating the SERDES 437-1, the switch circuitry 470 can also deactivate the link interface 434-1 and the memory module component 440-1 that are coupled to the SERDES 437-1.

FIG. 4B illustrates SERDES 437-1, 437-2, 437-3, and 437-4 coupled to and/or located on each corresponding link interface controller 434-1, 434-2, 434-3. As illustrated in FIG. 4B, the switch circuitry 470 can be coupled to a portion of the number of SERDES 437-1 AND 437-2. Embodiments are not limited to a particular number of SERDES that can be coupled and controlled by the switch circuitry (e.g., switch circuitry 470). For example, the switch circuitry 470 can be coupled to and control 4 different SERDES, as described in FIG. 4A. For example, the switch circuitry 470 can be coupled to and control 2 different SERDES as illustrated in FIGS. 4B and 4C. Similarly, more than one switch circuitry (e.g., switch circuitry 470) can be coupled to the logic device to control different set of the number of SERDES. For example, the computing device (e.g., computing device 200) can include two different switch circuitries and four different SERDES, where each switch circuitry can control two of four different SERDES.

As illustrated herein, the computing device (e.g., computing device 200) can be configured to use only a portion of the number of SERDES and other memory components (e.g., link interface controllers 434-1, 434-2, 434-3, and 434-4 and memory module components 440-1, 440-2, 440-3, and 440-4) coupled to each corresponding SERDES for power efficiency, among other reasons. For example, a portion of the number of SERDES may be in an active state (e.g., a portion of the number of SERDES in use), and another portion of the number of SERDES may be in an inactive state (e.g., a portion of the number of SERDES not in use). For example, the SERDES 437-1 coupled to the switch circuitry 470 can be in the active state while the SERDES 437-2 coupled to the same switch circuitry 470 can be in the inactive, as illustrated in FIG. 4B. A number of embodiments of the present disclosure are not limited to a particular number of SERDES that may be in the active or inactive state. For example, four different SERDES may be coupled to the switch circuitry (e.g., SERDES 437-1, 437-2, 437-3, AND 437-4 coupled to switch circuitry 470 as illustrated in FIG. 4A), and three SERDES may be in the active state while one SERDES may be in the inactive state.

FIG. 4C illustrates the number of SERDES 437-1, 437-2, 437-3, and 437-4 coupled to and/or located on each corresponding link interface controller 434-1, 434-2, 434-3, and 434-4 and coupled to the switch circuitry 470. Upon determining that the portion of the number of SERDES has failed, the switch circuitry can be configured to deactivate failed SERDES and activate non-failed SERDES. For example, as illustrated in FIG. 4B, the SERDES 437-1 may be in the active state, and the SERDES 437-2 may be in the inactive state prior to the failure event and/or abnormal functioning of the SERDES 437-1. When the SERDES 437-1 has experienced the failure event and determined to be failed, the switch circuitry 470 can be configured to deactivate the SERDES 437-1. Simultaneously or upon deactivating the SERDES 437-1, the switch circuitry 470 can be configured to activate the SERDES 437-2 to maintain function of the logic device (e.g., logic device 360-1 and 360-2), as illustrated in FIG. 4C. However, embodiments are not limited so. For example, the switch circuitry 470 can be configured to activate and/or deactivate a number of SERDES for various purposes including power efficiency, among others.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a number of memory devices of a hybrid memory cube (HMC); and
a logic die of the HMC, the logic die on which the number of memory devices are stacked and including:
a number of vault controllers, each of the number of vault controllers coupled to a respective one of a plurality of vaults of the number of memory devices such that each vault is controllable by a corresponding one of the number of vault controllers from others of the plurality of vaults;
an HMC switch coupled to the number of vault controllers;
a number of link interface controllers coupled to the HMC switch and configured to control a respective number of input/output (I/O) links, the number of link interface controllers including:
a first link interface controller including a first serialization/deserialization (SERDES) component;
and a second link interface controller including a second SERDES component; and
a switch component coupled to the number of link interface controllers including the first SERDES component and the second SERDES component, the switch component configured to control which of the first SERDES component and the second SERDES component is activated.

2. The apparatus of claim 1, wherein the switch component is configured to, responsive to a determination of a failure event, deactivate the first SERDES component.

3. The apparatus of claim 2, wherein the failure event occurs when the first SERDES component fails.

4. The apparatus of claim 2, wherein the switch circuitry is configured to activate the second SERDES component in response to the determination of the failure event.

5. The apparatus of claim 2, wherein the first SERDES component is in an active state prior to the failure event.

6. The apparatus of claim 2, wherein the second SERDES component is in an inactive state prior to the failure event.

7. The apparatus of claim 2, wherein the apparatus is configured to monitor electrical signals of the first SERDES component and the second SERDES component to determine the failure event.

8. An apparatus, comprising:
a number of memory devices of a hybrid memory cube (HMC);
and a logic die of the HMC, the logic die on which the number of memory devices are stacked and including:
a number of vault controllers, each of the number of vault controllers coupled to a respective one of a plurality of vaults of the number of memory devices such that each vault is controllable by a corresponding one of the number of vault controllers from others of the plurality of vaults;
an HMC switch coupled to the number of vault controllers;
a number of link interface controllers coupled to the HMC switch and configured to control a respective number of input/output (I/O) links, the number of link interface controllers including a number of serialization/deserialization (SERDES) components; and
a switch circuitry coupled to the number of link interface controllers including the number of SERDES components, the switch circuitry configured to, responsive to a determination of a failure event, control a number of SERDES components.

9. The apparatus of claim 8, wherein the switch circuitry is configured to, responsive to the determination of the failure event, deactivate one of the number of SERDES components.

10. The apparatus of claim 9, wherein the failure event occurs when one of the number of SERDES components fails.

11. The apparatus of claim 10, wherein the switch circuitry is configured to activate another SERDES component in response to the determination of the failure event.

12. The apparatus of claim 8, wherein the apparatus is configured to monitor electrical signals of the number of SERDES components to determine the failure event.

13. A method, comprising:
activating, by a switch, a first serialization/deserialization (SERDES) component on a logic die of a hybrid memory cube (HMC), wherein:
a number of memory devices of the HMC are stacked on the logic die; and
the logic die includes a number of vault controllers, each of the number of vault controllers coupled to a respective one of a plurality of vaults of the number of memory devices such that each vault is controllable by a corresponding one of the number of vault controllers from others of the plurality of vaults;
an HMC switch coupled to the number of vault controllers; and
a number of link interface controllers coupled to the HMC switch and configured to control a respective number of input/output (I/O) links, the number of link interface controllers including:
a first link interface controller including the first SERDES component;
and a second link interface controller including the second SERDES component; and
activating a second SERDES component and deactivating the first SERDES component, via the switch coupled to the first SERDES component and the second SERDES component.

14. The method of claim 13, wherein the method includes activating the second SERDES component in response to detecting abnormal function in the first SERDES component.

15. The method of claim 13, wherein the second SERDES component is in an inactive state prior to activating the second SERDES component.

16. The method of claim 13, wherein the method includes monitoring electrical signals of the first SERDES component and the second SERDES component to detect abnormal function in the first SERDES component and the second SERDES component.

17. The method of claim 13, wherein the method includes controlling a third SERDES component and a fourth SERDES via the switch.

18. The method of claim 17, wherein the method includes activating the third SERDES component and deactivating the second SERDES component in response to detecting abnormal function in the second SERDES component.

19. The method of claim 18, wherein the method includes activating the fourth SERDES component in response to detecting abnormal function in the third SERDES component.

20. A method, comprising:
   determining, by a switch circuitry, a failure event of a first portion of a number of serialization/deserialization (SERDES) components on a logic die of a hybrid memory cube (HMC), wherein:
      a number of memory devices of the HMC are stacked on the logic die; and the logic die includes a number of vault controllers, each of the number of vault controllers coupled to a respective one of a plurality of vaults of the number of memory devices such that each vault is controllable by a corresponding one of the number of vault controllers from others of the plurality of vaults;
      an HMC switch coupled to the number of vault controllers; and
      a number of link interface controllers coupled to the HMC switch and configured to control a respective number of input/output (I/O) links, the number of link interface controllers including:
         a first link interface controller including the first portion of the number of SERDES components; and
         a second link interface controller including the second portion of the number of SERDES components; and
      deactivating, responsive to a determination of the failure event, the first portion of the number of SERDES components by the switch circuitry.

21. The method of claim 20, wherein the failure event occurs when the first portion of the number of SERDES components fails.

22. The method of claim 20, wherein the first portion of the number of SERDES components is in an active state prior to the failure event.

23. The method of claim 20, wherein the method includes activating, responsive to the determination of the failure event, a second portion of a number of SERDES components of the logic die by the switch circuitry.

24. The method of claim 23, wherein the method includes activating the second portion of the number of SERDES components prior to deactivating the first portion of the number of SERDES components.

25. The method of claim 23, wherein the second portion of the number of SERDES components is in an inactive state prior to the failure event.

26. The method of claim 20, wherein the method includes monitoring, by the switch circuitry, electrical signals of the number of SERDES components to determine the failure event.

* * * * *